(12) United States Patent
Kwak et al.

(10) Patent No.: US 10,167,207 B2
(45) Date of Patent: Jan. 1, 2019

(54) ELECTROLYTIC APPARATUS WITH CIRCULATOR, REVERSE OSMOSIS FILTER, AND COOLER, FOR PRODUCING REDUCING WATER

(71) Applicant: SAMSUNG ELECTRONICS CO., LTD., Suwon-si, Gyeonggi-do (KR)

(72) Inventors: Hyun Suk Kwak, Gwangju (KR); Young Chul Ko, Suwon (KR); Young Uk Yun, Suwon (KR); Tae Gyu Kim, Hwaseong (KR); Chang Bae Lim, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 732 days.

(21) Appl. No.: 13/627,440

(22) Filed: Sep. 26, 2012

(65) Prior Publication Data

US 2013/0087488 A1    Apr. 11, 2013

(30) Foreign Application Priority Data

Oct. 5, 2011   (KR) .................. 10-2011-0100967
Aug. 27, 2012  (KR) .................. 10-2012-0093967

(51) Int. Cl.
*B01D 35/06* (2006.01)
*B01D 27/08* (2006.01)
(Continued)

(52) U.S. Cl.
CPC ............ *C02F 1/4618* (2013.01); *B01D 61/48* (2013.01); *B01D 61/54* (2013.01); *B01D 61/58* (2013.01);
(Continued)

(58) Field of Classification Search
CPC . A61M 1/3679; B01D 21/0012; B01D 27/08; B01D 29/00; B01D 21/00;
(Continued)

(56) References Cited

U.S. PATENT DOCUMENTS 3,305,306 A * 2/1967 Morawe ................ B01J 39/046
                                                     210/670
4,803,089 A   2/1989 Chaveron et al.
(Continued)

FOREIGN PATENT DOCUMENTS

CN       102186781        9/2011
EP       1293481 A2       3/2003
(Continued)

OTHER PUBLICATIONS

Partial European Search Report dated Jan. 25, 2013 for corresponding European Application No. 12187506.6.
(Continued)

*Primary Examiner* — Hayden Brewster
(74) *Attorney, Agent, or Firm* — Staas & Halsey LLP

(57) ABSTRACT

An apparatus for producing reducing water that maintains a neutral range of pH and exhibits superior reducing force. The apparatus for producing reducing water includes an electrolytic bath including a cathode chamber provided with a cathode, an anode chamber provided with an anode, and an intermediate chamber interposed between the cathode chamber and the anode chamber, wherein the cathode chamber and the intermediate chamber are provided with an inlet through which water is supplied, and an outlet through which water is discharged, a cation exchange membrane is provided between the cathode chamber and the intermediate chamber, and the intermediate chamber includes a cation exchange resin that dissociates hydrogen ions when the cation exchange resin reacts with water.

5 Claims, 16 Drawing Sheets

(51) Int. Cl.
  *C02F 1/461* (2006.01)
  *B01D 61/48* (2006.01)
  *B01D 61/54* (2006.01)
  *B01D 61/58* (2006.01)
  *F02M 37/22* (2006.01)
  *C25F 7/00* (2006.01)
  *C25C 7/00* (2006.01)
  *C25D 17/00* (2006.01)
  *B01D 61/02* (2006.01)
  *C02F 1/44* (2006.01)
  *C02F 1/42* (2006.01)
  *C02F 103/02* (2006.01)

(52) U.S. Cl.
  CPC ............ *B01D 61/025* (2013.01); *C02F 1/441* (2013.01); *C02F 2001/425* (2013.01); *C02F 2001/4619* (2013.01); *C02F 2001/46157* (2013.01); *C02F 2001/46195* (2013.01); *C02F 2103/026* (2013.01); *C02F 2201/4618* (2013.01); *C02F 2201/46115* (2013.01); *C02F 2201/46155* (2013.01); *C02F 2209/42* (2013.01); *C02F 2301/046* (2013.01); *C02F 2307/12* (2013.01)

(58) Field of Classification Search
  CPC ...... B01D 35/06; B01D 2201/50; B23H 3/02; B23H 7/04; B23H 7/14; C02F 1/001; C02F 1/24; C02F 1/42; C02F 1/44; C02F 1/283; C02F 1/441; C02F 1/461; C02F 1/4606; C02F 1/4618; C02F 1/4674; C02F 1/46104; C02F 3/12; C02F 3/28; C02F 3/207; C02F 3/301; C02F 3/302; C02F 3/1257; C02F 9/00; C02F 9/005; C02F 103/02; C02F 2001/46133; C02F 2001/46152; C02F 2201/4611; C02F 2201/4612; C02F 2201/4613; C02F 2201/4615; C02F 2201/4618; C02F 2201/46104; C02F 2201/46115; C02F 2201/46125; C02F 2201/46145; C02F 2209/42; C25B 9/00; C25B 9/04; C25B 9/08; C25B 15/00; C25B 15/08; C25C 3/16; C25C 3/20; C25C 7/00; C25D 5/08; C25D 17/00; C25D 21/12; C25F 7/00; F02M 37/22
  USPC ...... 204/228.2, 228.3, 228.6, 237, 240, 263; 205/743, 747, 748; 210/194, 243, 251, 210/259
  See application file for complete search history.

(56) References Cited

U.S. PATENT DOCUMENTS

| | | | |
|---|---|---|---|
| 5,049,250 A | | 9/1991 | Chlanda |
| 5,593,554 A | | 1/1997 | Yamanaka et al. |
| 6,080,313 A | * | 6/2000 | Kelada .................... C02F 9/005 210/202 |
| 6,143,163 A | | 11/2000 | Sawamoto et al. |
| 2003/0056805 A1 | * | 3/2003 | Sumita ........................ 134/1.3 |
| 2006/0091013 A1 | * | 5/2006 | Takahashi .............. B01D 61/48 204/632 |
| 2008/0299432 A1 | * | 12/2008 | Hoffjann ................ B64D 13/00 429/456 |
| 2008/0302651 A1 | * | 12/2008 | Arai et al. ............... 204/157.15 |
| 2010/0062113 A1 | | 3/2010 | Sumita |
| 2010/0200425 A1 | | 8/2010 | Arai |
| 2011/0129758 A1 | * | 6/2011 | Naya ................... C02F 1/46104 429/479 |
| 2011/0198236 A1 | | 8/2011 | Sumita et al. |

FOREIGN PATENT DOCUMENTS

| | | | | |
|---|---|---|---|---|
| EP | | 2 179 971 A1 | 4/2010 | |
| EP | | 2 338 841 A1 | 6/2011 | |
| EP | | 2508482 A1 | 10/2012 | |
| GB | | 2197307 A * | 5/1988 | ............ B01J 47/024 |
| JP | | 7-966 | 1/1995 | |
| KR | | 10-2010-0021302 | 2/2010 | |
| KR | | 10-2011-0082568 | 7/2011 | |
| RU | | 2060231 | 5/1996 | |
| RU | | 2105725 | 2/1998 | |
| WO | | WO 91/02584 A1 | 3/1991 | |
| WO | | WO 2008/015867 A1 | 2/2008 | |

OTHER PUBLICATIONS

International Search Report dated Mar. 22, 2013 for corresponding International Application No. PCT/KR2012/007730.
Russian Office Action dated Mar. 18, 2015 in corresponding Russian Patent Application No. 2014113267/05(020773).
Australian Office Action dated Mar. 12, 2015 in corresponding Australian Patent Application No. 2012319378.
European Office Action dated Oct. 19, 2016 from European Patent Application No. 12 187 506.6.
Canadian Office Action dated Nov. 7, 2016 from Canadian Patent Application No. 2,850,463.
European Office Action dated May 29, 2017 in the related European Application No. 12 187 506.6.
Canadian Notice of Allowance dated Jun. 30, 2017 in the related Canadian Application No. 2,850,463.
Communication under Rule 71(3) dated Nov. 7, 2017 in corresponding European Patent Application No. 12 187 506.6, 46 pages.
Chinese Office Action dated Apr. 15, 2015 issued in corresponding Chinese Patent Application No. 201210377698.X (10 pages).
Indian Office Action dated Apr. 18, 2018 issued in corresponding Indian Patent Application No. 2634/DELNP/2014 (6 pages).
Korean Patent Office Action issued in Korean Patent Application No. 10- 2012-0093967 dated Sep. 3, 2018 (15 Total No. pages).

* cited by examiner

ELECTROLYTIC APPARATUS WITH CIRCULATOR, REVERSE OSMOSIS FILTER, AND COOLER, FOR PRODUCING REDUCING WATER

CROSS-REFERENCE TO RELATED APPLICATIONS

This application claims the benefit of Korean Patent Application Nos. 10-2011-0100967 and 10-2012-0093967, filed on Oct. 5, 2011 and Aug. 27, 2012, respectively, in the Korean Intellectual Property Office, the disclosures of which are incorporated herein by reference.

BACKGROUND

1. Field

Embodiments of the present disclosure relate to an apparatus for producing reducing water. More specifically, embodiments of the present disclosure relate to an apparatus for producing reducing water with superior reducing force.

2. Description of the Related Art

In accordance with extension of the water market corresponding to economic growth, water is obtained by a variety of methods. For example, in a conventional method, water is obtained from springs or tap water is boiled, while in recent years, a water purifier is used, including a household alkali ion water purifier which is used in order to promote healthful attributes of water to reduce un-wellness or ill health of the body.

On type of water purifier is a reverse osmosis (RO) type water purifier which is capable of removing 70 to 90% of turbidity, bacteria, viruses, organic compounds, agricultural chemicals, heavy metals, disinfection by-products, inorganic ions and the like present in water and obtaining clean and drinkable water having a neutral range of pH (pH of 5.8 to 8.5). For this purpose, such a water purifier has a configuration in which 3 to 5 filters are commonly mounted in a water purifier, purified water is stored in a water tank, and either cool water or hot water is selectively obtained, as desired.

However, water obtained from a water purifier has only a basic function of satisfying thirst of human body to support life, and has an oxidization force equivalent to or higher than tap water in terms of the health index represented by an oxidation reduction potential (hereinafter, referred to as an "ORP") of water.

A product developed in order to negate the drawbacks of water purifiers and impart functionalities is an alkali ion water purifier. The alkali ion water purifier is a medical apparatus for producing pH 8.5 or higher water, which provides reduction effects in four gastrointestinal symptoms (chronic diarrhea, dyspepsia, gastrointestinal heterofermentation, and hypergastric acidity) and has been approved by the Korean Food and Drug Administration. In the medical field, clinical tests have demonstrated that the alkali ion water purifier is efficacious in treatment of various diseases such as intestinal diseases, vascular diseases, diabetes and atopic dermatitis. Recent academy and research paper reports that the main efficacy is caused by the reducing force of water.

However, water in the alkali ion water purifier should contain a sufficient amount of ions, since ions dissolved in water serve as electrolytes and alkali ion water is produced during normal electrolysis. In order to maintain the amount of ions, the filter is limited to an ultra-filtration (UF) filter, satisfying general water purification requirements, rather than an RO filter. Also, when a voltage and a current applied during electrolysis are increased in order to improve reducing force of alkali ion water, pH of water is increased. The alkali ion water thus produced is unsuitable for use in drinkable water.

SUMMARY

Therefore, it is one aspect of the present disclosure to provide an apparatus for producing reducing water that maintains a neutral range of pH and exhibits superior reducing force.

Also, it is another aspect of the present disclosure to provide an apparatus for producing reducing water that improves lifespan of a cation exchange resin used for an apparatus for producing reducing water.

Additional aspects of the disclosure will be set forth in part in the description which follows and, in part, will be apparent from the description, or may be learned by practice of the disclosure.

In accordance with one aspect of the present disclosure, an apparatus for producing reducing water includes an electrolytic bath including a cathode chamber provided with a cathode, an anode chamber provided with an anode, and an intermediate chamber interposed between the cathode chamber and the anode chamber, wherein the cathode chamber and the intermediate chamber are provided with an inlet through which water is supplied, and an outlet through which water is discharged, a cation exchange membrane is provided between the cathode chamber and the intermediate chamber, and the intermediate chamber includes a cation exchange resin that dissociates hydrogen ions when the cation exchange resin reacts with water.

The apparatus may further include a circulator to supply water to the intermediate chamber and supply water discharged through the cation exchange resin to the intermediate chamber again.

The circulator may include: a water tank to store water supplied to the intermediate chamber; a channel to form a passage, enabling water present in the water tank to circulate between the intermediate chamber and the water tank; and a pump to circulate water present in the water tank to circulate between the intermediate chamber and the water tank.

The water tank may include a water level sensor to sense a level of water stored in the water tank.

The water tank may include an outlet through which water stored in the water tank is discharged outside.

The apparatus may include a cooling apparatus to reduce temperature of water supplied to the intermediate chamber by the circulator.

The cooling apparatus may include a fan or a cooler using a thermoelectric semiconductor or a refrigerant.

The circulator may include a channel to form a passage, enabling water having passed through the intermediate chamber to be introduced into the intermediate chamber again; a pump to circulate water supplied to the intermediate chamber along the channel; and a valve to control flow of water supplied to the intermediate chamber.

The apparatus may further include a reverse osmosis (RO) filter to purify water supplied to the electrolytic bath or the circulator.

The apparatus may further include a valve to control flow of water so that the water supplied from the RO filter is supplied to the cathode chamber or the circulator.

The apparatus may further include a cation exchange membrane disposed between the anode chamber and the intermediate chamber.

The cathode, the cation exchange membrane provided between the cathode chamber and the intermediate chamber, and the cation exchange resin may contact one another, and the cation exchange resin, the cation exchange membrane provided between the intermediate chamber and the anode chamber, and the anode may contact one another.

Also, the cathode and the anode may be provided with holes through which water is passed.

Also, the cathode and the anode may have a mesh structure.

The cation exchange resin may be recycled by reversing the cathode and the anode.

Also, the apparatus may further include a power supply to supply voltage to the electrolytic bath.

The apparatus may further include a cation exchange resin filter through which water supplied to the intermediate chamber is passed.

The cation exchange resin filter may further include a cation exchange resin that dissociates hydrogen ions, when the cation exchange resin reacts with water.

The apparatus may further include a reverse osmosis (RO) filter to purify water supplied to the cation exchange resin filter or the cathode chamber.

The apparatus may further include a branch channel to supply water purified through the RO filter to the cation exchange resin filter and the cathode chamber of the electrolytic bath.

The cation exchange resin filter may include an inlet through which water supplied from the RO filter is introduced; and an outlet through which water supplied to the intermediate chamber is discharged.

The cation exchange resin filter may be interposed between the RO filter and the electrolytic bath such that water passes through the cation exchange resin filter, before the water is supplied to the intermediate chamber.

The cation exchange resin filter may be detachably mounted on the apparatus for producing reducing water.

In accordance with another aspect of the present disclosure, an apparatus for producing reducing water includes an electrolytic bath including a cathode chamber provided with a cathode, an anode chamber provided with an anode, and an intermediate chamber interposed between the cathode chamber and the anode chamber; and a cation exchange resin filter through which water supplied to the intermediate chamber is passed, wherein the cathode chamber and the intermediate chamber are provided with an inlet through which water is supplied, and an outlet through which water is discharged, and a cation exchange membrane is provided between the cathode chamber and the intermediate chamber.

The apparatus may further include a cation exchange resin filter through which water supplied to the intermediate chamber is passed.

The cation exchange resin filter may further include a cation exchange resin that dissociates hydrogen ions, when the cation exchange resin reacts with water.

The apparatus may further include a reverse osmosis (RO) filter to purify water supplied to the cation exchange resin filter or the cathode chamber.

The apparatus may further include a branch channel to supply water purified through the RO filter to the cation exchange resin filter and the cathode chamber of the electrolytic bath.

The cation exchange resin filter may include an inlet through which water supplied from the RO filter is introduced; and an outlet through which water supplied to the intermediate chamber is discharged.

The cation exchange resin filter may be interposed between the RO filter and the electrolytic bath such that water passes through the cation exchange resin filter, before the water is supplied to the intermediate chamber.

The cation exchange resin filter may be detachably mounted on the apparatus for producing reducing water.

The apparatus may further include a cation exchange membrane disposed between the anode chamber and the intermediate chamber.

The cathode, the cation exchange membrane provided between the cathode chamber and the intermediate chamber, and the cation exchange resin may contact one another, and the cation exchange resin, the cation exchange membrane provided between the intermediate chamber and the anode chamber, and the anode may contact one another.

Also, the cathode and the anode may be provided with holes through which water is passed.

Also, the cathode and the anode may have a mesh structure.

According to one aspect of the present disclosure, it is possible to obtain reducing water that has a neutral pH and exhibits superior reducing force.

Also, it is possible to prevent proliferation of bacteria in the cation exchange resin in the intermediate chamber using the cation exchange resin filter.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, preferred embodiments of the present disclosure will be described with reference to the accompanying drawings.

First, a conventional alkali ion water purifier will be described.

Figure 1:
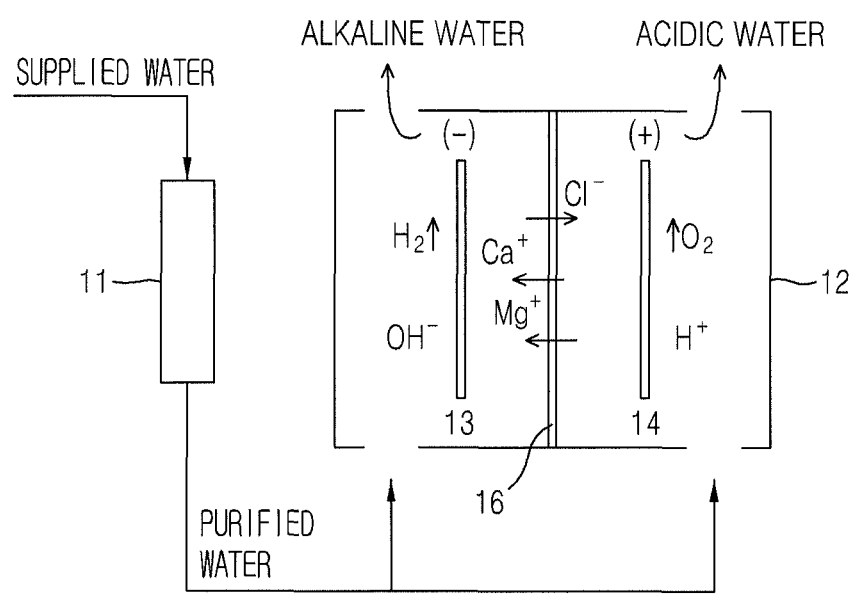
FIG. 1 is a schematic view illustrating a driving mechanism of a conventional alkali ion water purifier.

FIG. 1 is a schematic view illustrating a driving mechanism of a conventional alkali ion water purifier.

The alkali ion water purifier includes a UF filter 11 and an electrolytic bath 12, and the electrolytic bath 12 includes a cathode 13, an anode 14 and an ion-exchange membrane 16 disposed between the cathode 13 and the anode 14.

Water passes through the UF filter 11. As a result, invisible microorganisms with a size of 0.01 μm or higher such as viruses, particulate bacteria and algal spores are removed, while ions and fine components with a size smaller than 0.01 μm are passed. The purified water thus obtained is added to an electrolytic bath 12 and a predetermined electric energy is applied thereto to decompose the water. The electrolysis of the water occurring in both electrodes 13 and 14 are depicted by the following Reaction Scheme 1.

Cathode (−electrode): $2H_2O + 2e^- \rightarrow H_2 + 2OH^-$, $E^0 = -0.828V$

Anode (+electrode): $4H^+ + O_2 + 4e^- \rightarrow 2H_2O$, $E^0 = +1.229V$ [Reaction Scheme 1]

In this case, regarding an oxidation reduction potential (ORP; electromotive force relative to a standard hydrogen electrode) of water produced in the cathode 13, an electromotive force of a standard hydrogen electrode may be depicted by the following Equation 1 under the assumption that only $OH^-$ and $H_2$ are abnormally present in water:

$$E = 828 - \left(\frac{59}{n}\log\left(\frac{H_{2\text{-}standard\ hydrogen\ electrode}}{H_{2\text{-}cathode} \times (OH^-)^2}\right)\right)$$ [Equation 1]

wherein n represents a number of reacted electrons, $H_{2\text{-}standard\ hydrogen\ electrode}$ and $H_{2\text{-}cathode}$ represent a $H_2$ concentration (mol/L) of a standard hydrogen electrode and a $H_2$ concentration (mol/L) of a cathode, respectively, and $OH^-$ represents a concentration of $OH^-$ (mol/L).

In Equation 1, spontaneous reaction occurs until $E = E+ - E- $ reaches 0 mV from a positive value mV. A hydrogen reduction potential difference is represented by a negative (−) value, since electrons move from a working electrode to the standard hydrogen electrode. In this case, water containing the working electrode represents reducing force. When electrons move from the standard hydrogen electrode to the working electrode, the value of hydrogen reduction potential difference is represented by a positive (+) value and a working solution represents an oxidizing force.

As can be seen from Reaction Scheme 1, when the voltage of $E = E^+ - E^- = 1.229 - (-0.828) = 2.057V$ is applied to both electrodes, the introduced water generates hydrogen gas ($H_2$) and a hydroxyl group ($OH^-$) in the cathode and thus becomes alkaline. In accordance with Equation 1, the value of ORP decreases and may have a negative (−) value. In the anode, the water generates oxygen gas ($O_2$) and hydrogen ions ($H^+$) and thus becomes acidic. In accordance with Equation 1, the value of ORP is a positive (+) value.

In conventional alkali ion water purifiers, as applied voltage increases, alkalinity increases, and pH and reducing force of reducing water increase. For example, the alkali ion water purifier approved by the Korean Food and Drug Administration is limited to a 2-grade medical apparatus having a pH range of 8.5 to 10. For this reason, ORP is −85 mV at pH 10. When applied voltage is further increased in order to improve reducing force, an $OH^-$ generation amount increases in proportion to a $H_2$ gas generation amount, as shown in Reaction Scheme 1. For this reason, pH increases and, as a result, undrinkable water is produced. Accordingly, reducing force of reducing water that can be produced using the alkali ion water purifier has a limitation of pH increase and there is thus a restriction on maximizing the value thereof.

Also, commercially available RO filter-type water purifiers have a basic water purification function of removing free residual chlorine, chromaticity, turbidity, chloroform, microorganisms and bacteria present in water, as well as a specific water purification function of removing organic compounds, agricultural chemicals, heavy metals and inorganic ions, to yield pure water free of these components. The purified water has an average water conductivity of 5 to 15 μs/cm, which is 1/15 to 1/40 lower than the average conductivity of general tap water (about 200 to about 220 μs/cm).

In order to electrolyze water that has the same purity as ion water passed through the UF filter, application of an energy of 400 to 500V is required. That is to say, configuration of an electrolysis system of pure water passed through the RO filter is considerably impractical, since electrolytic efficiency is sharply decreased.

The apparatus for producing reducing water according to one embodiment of the present disclosure solves the problems of the water purifier and alkali ion water purifier and thereby enables production of water that exhibits superior reducing force and has a neutral pH range.

Figure 2:
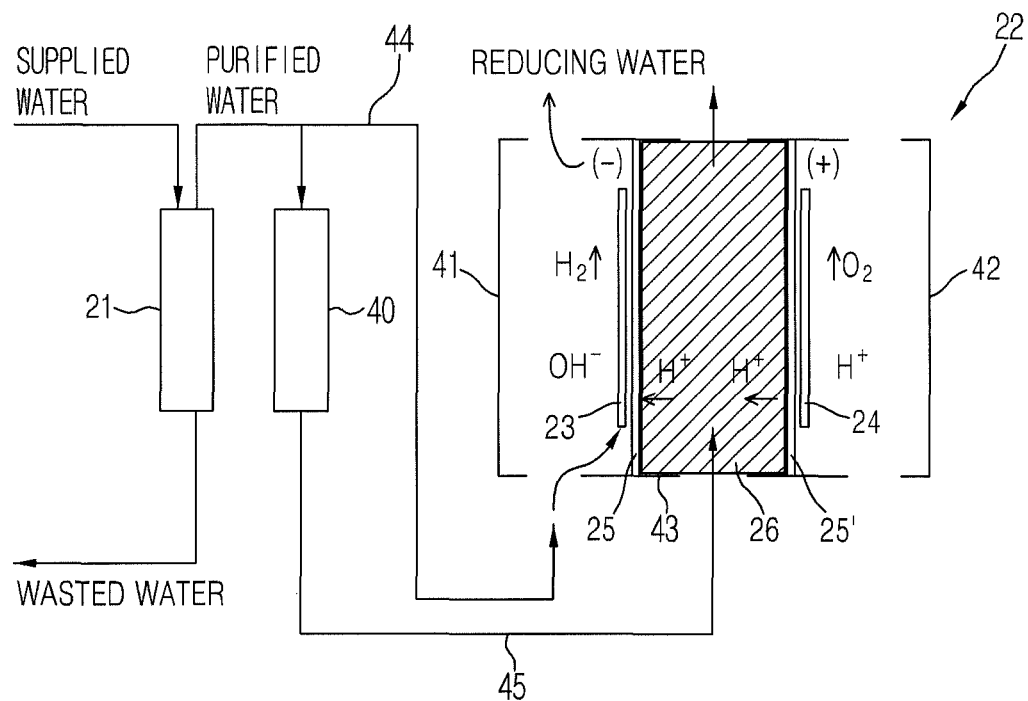
FIGS. 2 and 3 are schematic views illustrating a driving mechanism of an apparatus for producing reducing water according to one embodiment of the present disclosure.
Figure 3:
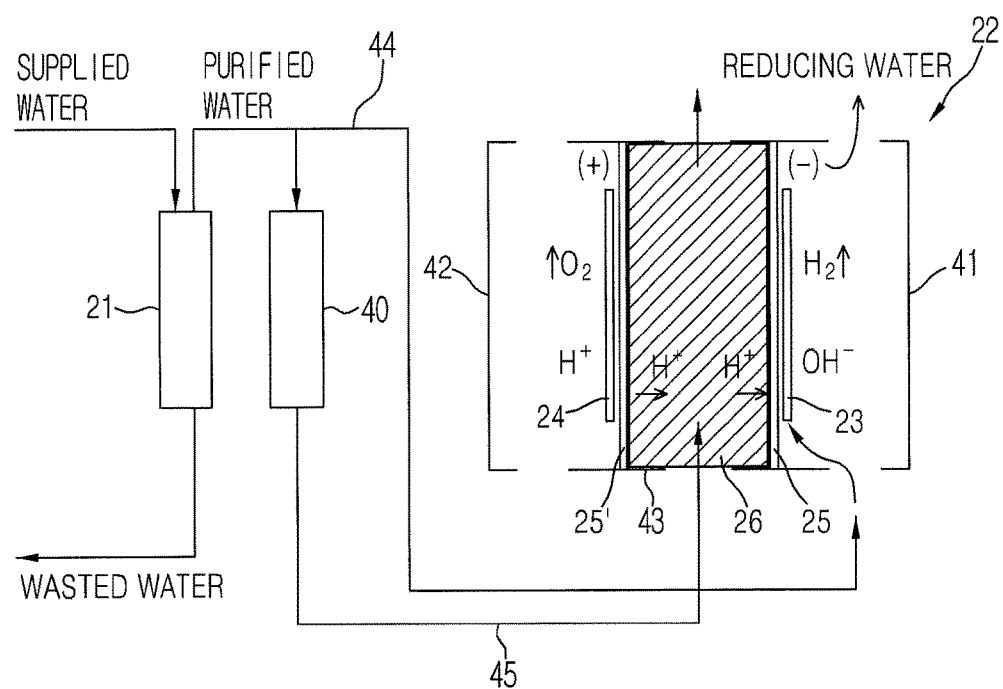
Figure 4:
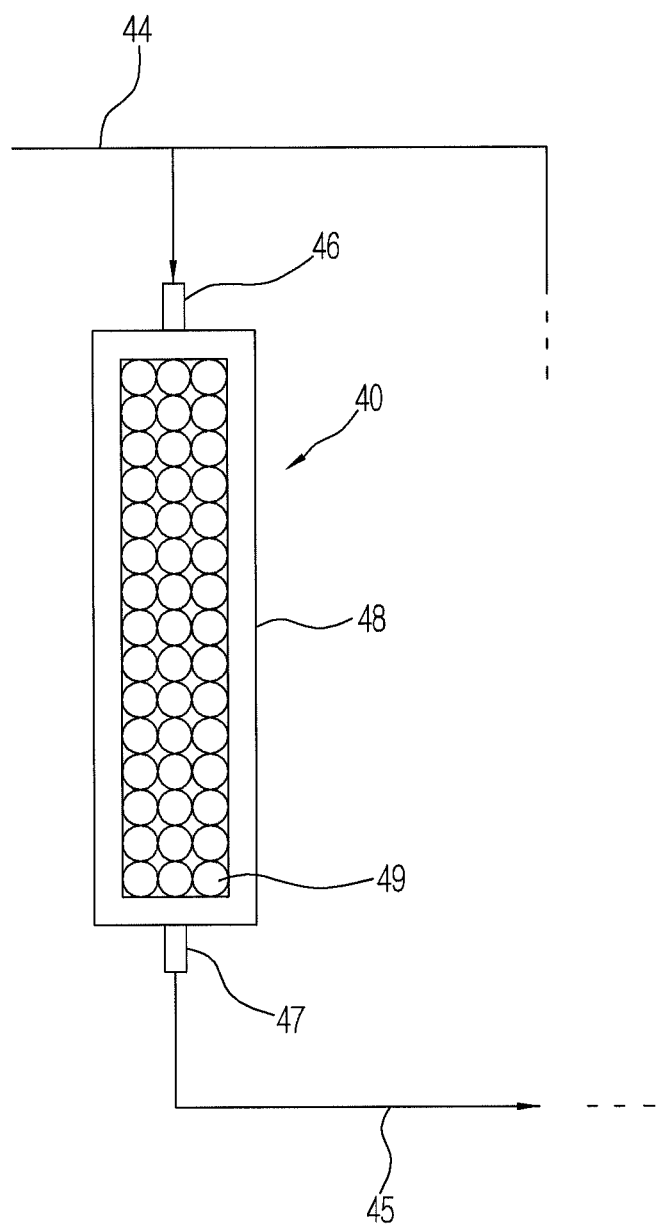
FIG. 4 is a view illustrating a cation exchange resin filter in an apparatus for producing reducing water shown in FIGS. 2 and 3.

FIGS. 2 and 3 are views illustrating a driving mechanism of an apparatus for producing reducing water according to one embodiment of the present disclosure, and FIG. 4 is a view illustrating a cation exchange resin filter 40 of an apparatus for producing reducing water shown in FIGS. 2 and 3.

Referring to FIG. 2, the apparatus for producing reducing water according to one embodiment of the present disclosure includes an electrolytic bath 22 including a cathode chamber 41 provided with a cathode 23, an anode chamber 42 provided with an anode 24, and an intermediate chamber 43 interposed between the cathode chamber 41 and the anode chamber 42; an RO filter 21 to purify water supplied to the electrolytic bath 22; and a cation exchange resin filter 40 through which water is supplied to the intermediate chamber 43 of the electrolytic bath 22.

The apparatus for producing reducing water according to one embodiment of the present disclosure adopts only advantages among advantages and disadvantages of a water purifier to provide clean water from which heavy metals, organic substances as well as inorganic ions have been removed, and of an alkali ion water purifier to provide water that has reducibility, but has alkalinity with pH of 8.5 or higher and satisfies a basic purification level from which free residual chlorine, chromaticity, turbidity and chloroform have been removed, thus preparing clean and stable water that exhibits a neutral pH range (pH 5.8~8.5) as well as superior reducing force, and from which microorganisms, bacteria, residual chlorine, heavy metals, organic compounds, agricultural chemicals and the like have been removed.

The electrolytic bath 22 includes a cathode chamber 41 provided with a cathode 23 for electrolysis of water, an anode chamber 42 provided with an anode 24 and an intermediate chamber 43 filled with a cation exchange resin 26, interposed between the cathode chamber 41 and the anode chamber 42.

Also, cation exchange membranes 25 and 25' are formed between the cathode 23 and the cation exchange resin 26, and between the cation exchange resin 26 and the anode 24, respectively, the cathode 23, the cation exchange membrane 25 and the cation exchange resin 26 contact one another, and the cation exchange resin 26, the cation exchange membrane 25' and the anode 24 may also contact one another.

When a predetermined distance is present between the cation exchange membranes 25 and 25', and the electrodes 23 and 24, movement efficiency of $H^+$ ions generated from the anode 24 through the cation exchange membrane 25' to the cation exchange resin 26 may be deteriorated and, as a result, an efficiency with which pH of reducing water produced from the cathode 23 is neutralized may be deteriorated. Accordingly, it is preferred that the cation exchange resin 26, the cation exchange membranes 25 and 25', and the electrodes 23 and 24 contact one another.

Meanwhile, water passed through the RO filter 21 is added to the electrolytic bath 22. The water passed through the RO filter 21 is directly introduced into the cathode chamber 41, while the water passed through the RO filter 21 is not directly introduced into the intermediate chamber 43 filled with the cation exchange resin 26 and is introduced into the intermediate chamber 43 after passing through the cation exchange resin filter 40 one more time. Since only cations pass through the cation exchange membranes 25 and 25', water introduced into the cathode chamber 41 is not moved through the cation exchange membrane 25 to the intermediate chamber 43. Similarly, water introduced into the intermediate chamber 43 is not moved through the cation exchange membrane 25 to the cathode chamber 41.

A sediment filter and a carbon filter may be further provided at the front end of the RO filter 21.

As depicted by Reaction Scheme 1 above, when a voltage of 2.057V or higher is applied, $H^+$ ions generated between the anode 24 and a soaked cation exchange membrane 25' adjacent thereto by electrolysis are transferred to the cathode 23 based on action of the cation exchange resin 26 as a catalyst, and the transferred $H^+$ ions cause an neutralization reaction with $OH^-$, as depicted by Reaction Scheme 2 below, thus preventing an increase in pH of reducing water generated in the cathode 23.

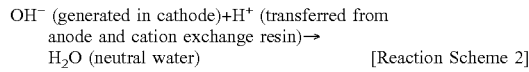

Accordingly, water has a negative value of ORP in a neutral pH range (5.8~8.5) due to $H_2$ generated from the cathode 23, thus exhibiting reducing force.

Figure 7:
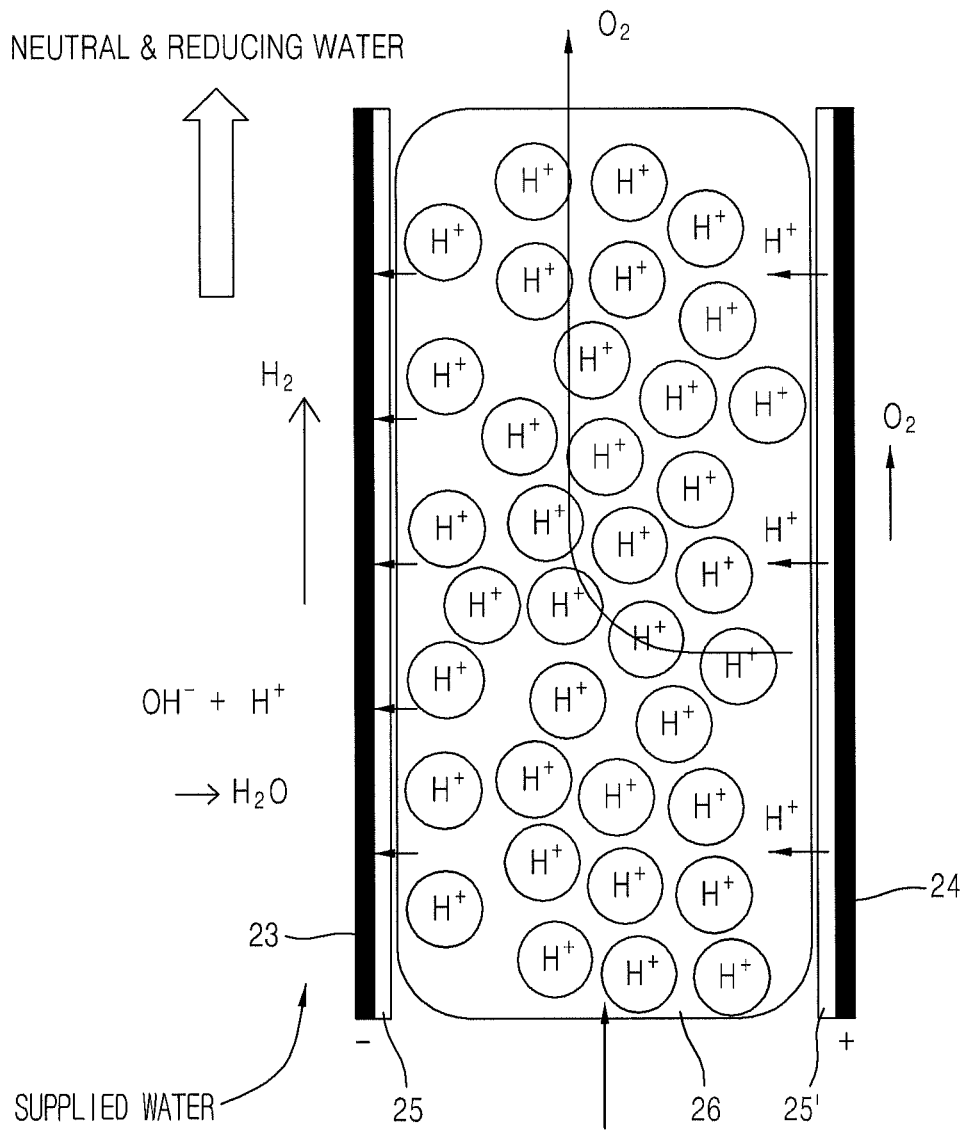
FIG. 7 is a view illustrating a function of the cation exchange resin filled in the intermediate chamber of FIG. 6.

More specifically, as shown in FIG. 7 below, water passed through the RO filter 21 is supplied to the cathode chamber 41 of the electrolytic bath 22, water passed through the cation exchange resin filter 40 is supplied to the intermediate chamber 43, and water introduced into the cation exchange resin 26 of the intermediate chamber 43 soaks the cation exchange membrane 25' contacting the anode 24.

When a voltage is applied in order to enable a predetermined current to flow in the electrolytic bath 22, water is electrolyzed between the surface of the cation exchange membrane 25' and the surface of the anode 24 to produce $H^+$ and $O_2$.

Since the $O_2$ produced in the anode 24 has a size of about 3.4 Å, water is not moved through the cation exchange membrane 25 to the cathode 23 and is discharged outside via water introduced into the cation exchange resin 26.

When water introduced into the cation exchange resin 26 stays without flowing, concentration of $O_2$ dissolved in water increases and thus oxidizes the cation exchange resin 26. As a result, the lifespan of the cation exchange resin 26 is reduced. Also, heat ($Q \propto W = I^2R$) generated during electrolysis is not discharged, and lifespan of the cation exchange membranes 25 and 25' and the cation exchange resin 26 is thus reduced.

Also, $H^+$ produced in the anode 24 is bonded to $OH^-$ produced in the cathode 23 to prevent an increase in pH that is caused by an increase in $OH^-$, although reducing force of reducing water emitted from the cathode chamber 41 is increased due to increase in $H_2$.

The electrolytic bath 22 may further include a power supply (not shown) to apply a voltage.

The cation exchange resin 26 filled in the intermediate chamber 43 may be an $H^+$-type cation exchange resin. For example, the cation exchange resin 26 is a resin in which a $SO_3H$ exchange group is linked to the surface of a polymer matrix. In this case, when the resin is soaked in water, $H^+$ ions are dissociated from the surface of the resin until they balance with $H^+$ ions in water.

As described above, the cation exchange resin 26 is filled in the intermediate chamber 43 made of a "☐"-shaped material between the cathode chamber 41 and the anode chamber 42. Based on an energy generated by a voltage difference in pure water, $H^+$ ions generated in the anode 24 cannot be moved to the cathode 23, while transfer of $H^+$ ions is possible from the anode 24 to the cathode 23 based on $H+$ ions dissociated from the cation exchange resin 26. Accordingly, a closed-loop configuration in which current flows even at a low voltage within a lifespan limit of the cation exchange resin 26 is formed.

Generally, bacteria are not observed in water passed through the RO filter. However, bacteria may be proliferated due to various causes such as introduction of external matters, as time passes, since the inside of the RO filter is always soaked in water.

However, although bacteria may proliferate, the amount of bacteria present in water passed through the RO filter is at a level harmless to the human body and reducing water produced in the cathode chamber 41 and discharged therefrom has no problem of use as drinkable water.

There is a problem in that, when bacteria are present in water passed through the RO filter and supplied to the intermediate chamber 43 filled with the cation exchange resin 26, the bacteria present in water are readily adsorbed on the cation exchange resin 26, since the cation exchange resin 26 is made of a polymer having a fine porous structure, such as polystyrene.

Bacteria adsorbed on the cation exchange resin 26 are not readily detached from the cation exchange resin 26, and the amount thereof is increased due to proliferation of bacteria, as time passes. As a result, the cation exchange resin 26 is discolored.

When the amount of bacteria is increased due to bacteria proliferation, the function of the cation exchange resin 26 is deteriorated, the lifespan thereof is shortened, and as a result, the function of the apparatus for producing reducing water is disadvantageously deteriorated.

In order to solve this problem, the apparatus for producing reducing water according to one embodiment of the present disclosure includes a cation exchange resin filter 40 mounted between the RO filter 21 and the intermediate chamber 43.

Before water passed through the RO filter 21 is supplied to the intermediate chamber 43 filled with the cation exchange resin 26, water passes through a cation exchange resin filter 40 filled with a cation exchange resin 49 that is the same as the cation exchange resin 26 filled in the intermediate chamber 43, to previously adsorb bacteria present in water emitted from the RO filter 21 on the cation exchange resin filter 40.

As a result, water from which bacteria have been removed while passing through the cation exchange resin filter 40 is supplied to the intermediate chamber 43 to prevent deterioration in function or reduction in lifespan of the cation exchange resin 26 of the intermediate chamber 43 caused by adsorption of bacteria.

As shown in FIG. 2, the cation exchange resin filter 40 receives water filtered through the RO filter 21 and supplies the filtered water to the intermediate chamber 43.

As shown in FIG. 4, the cation exchange resin filter 40 includes a housing 48 provided with an empty area in which the cation exchange resin 49 is filled.

Also, the housing 48 is provided at both ends thereof with an inlet 46 through which water passed through the RO filter 21 is supplied, and an outlet 47 through which the water supplied to the intermediate chamber 43 is discharged.

The cation exchange resin 49 filled in the empty area is an $H^+$-type cation exchange resin, which is the same type as the cation exchange resin 26 filled in the intermediate chamber 43 of the electrolytic bath 22.

For example, when a resin in which a $SO_3H$ exchange group is linked to the surface of a polymer matrix having a fine porous structure such as polystyrene is added to water, $H^+$ ions are dissociated from the surface of the resin until they balance with $H^+$ ions in water.

Water added to the cation exchange resin filter 40 is water purified through the RO filter 21 and has a pH of 6.2 to 6.5. Water passed through the cation exchange resin filter 40 contains $H^+$ ions dissociated from the surface of the cation exchange resin 49 and thus has a decreased pH of 4.2 to 4.5.

Meanwhile, when, in the intermediate chamber 43 of the electrolytic bath 22, water continuously passes through cation exchange resin 26, $H^+$ ions are continuously dissociated and consumed on the surface of the cation exchange resin 26. Accordingly, deterioration in function and reduction in lifespan of the cation exchange resin 26 are inevitable. Since water passed through the cation exchange resin filter 40 has a low pH of 4.2 to 4.5, as described above, it has a hydrogen ion concentration that is equivalent to or higher than the concentration of $H^+$ ions of the surface of the cation exchange resin 26. Accordingly, when such water is supplied to the intermediate chamber 43, the amount of $H^+$ ions dissociated and consumed on the surface of the cation exchange resin 26 is reduced and the lifespan of the cation exchange resin 26 is relatively lengthened.

Water passed through the RO filter 21 is separately supplied into the cation exchange resin filter 40 and the cathode chamber 41 of the electrolytic bath 22 through a branch channel 44. The branch channel 44 connected to the cation exchange resin filter 40 is connected to the inlet 46 of the cation exchange resin filter 40.

Water passed through the cation exchange resin filter 40 is connected to the intermediate chamber 43 through a channel connected to the cathode chamber 41 and another channel 45.

As described above, the cation exchange resin is periodically replaced, since bacteria are adsorbed on the cation exchange resin 49 of the cation exchange resin filter 40. Accordingly, the cation exchange resin filter 40 is detachably mounted on the apparatus for producing reducing water.

Together with the cation exchange resin filter 40 described above, the cation exchange resin 26 is recycled using $H^+$ ions generated by electrolysis, thereby extending lifespan of the cation exchange resin 26.

As shown in FIG. 2, $H^+$ ions generated by electrolysis in the anode 24 are moved to the cation exchange membrane 25' and the cation exchange resin 26, and a part of the cation exchange resin 26 adjacent to the anode 24 and the cation exchange membrane 25' is a H+ concentration higher than an equilibrium state and is thus partially recycled. Accordingly, as shown in FIG. 3, when, after electrolysis of a predetermined flow, polarity of the anode 24 and the cathode 23 of the electrolytic bath 22 of FIG. 2 that are bilaterally symmetric and water introduced into the electrolytic bath 22 are alternately changed, the cation exchange resin 26 functions to transfer H+ ions as a catalyst and recycle the same, thus continuously producing reducing water. Also, since water flows only in one direction, contamination of the ion exchange membrane is prevented by reversing flow of water that may be generated.

That is, via electrode interchange, the cathode 23 in FIG. 2 is changed into the anode 24 of FIG. 3 and the anode 24 of FIG. 2 is changed into the cathode 23 of FIG. 3.

Accordingly, as shown in FIG. 3, water passed through the RO filter 21 is supplied to the changed cathode chamber 41 disposed at the right. Since this structure is bilaterally symmetric based on the intermediate chamber 43, depending on the polarity of electrodes, the cathode 23 and the anode 24 may be interchanged.

Figure 5:
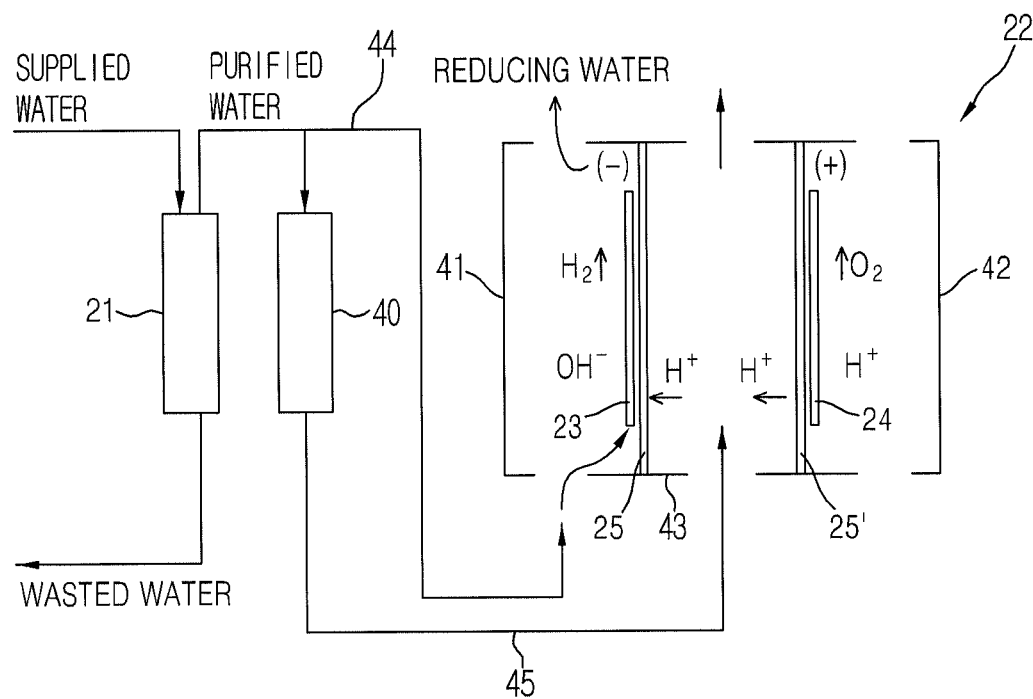
FIG. 5 is a schematic view illustrating a driving mechanism of an apparatus for producing reducing water according to a modified embodiment of the embodiment shown in FIGS. 2 and 3.

FIG. 5 is a view illustrating a driving mechanism of an apparatus for producing reducing water according to a modified embodiment of the embodiment of the present disclosure shown in FIG. 2.

The apparatus for producing reducing water shown in FIG. 5 includes an electrolytic bath 22 including a cathode chamber 41 provided with a cathode 23, an anode chamber 42 provided with an anode 24, and an intermediate chamber 43 interposed between the cathode chamber 41 and the anode chamber 42; a RO filter 21 to purify water supplied to the electrolytic bath 22; and a cation exchange resin filter 40 through which water supplied to the intermediate chamber 43 of the electrolytic bath 22.

The apparatus for producing reducing water shown in FIG. 5 and configuration thereof are the same as the apparatus for producing reducing water according to one embodiment of the present disclosure and configuration thereof described in FIG. 2, except that the cation exchange resin is not filled in the intermediate chamber 43 of the electrolytic bath 22.

Water passed through the cation exchange resin filter 40 has a pH of 4.2 to 4.5 and contains $H^+$ ions dissociated on the surface of the cation exchange resin 49, although the cation exchange resin is not filled in the intermediate chamber 43. Accordingly, $H^+$ ions are transferred from the anode 24 to the cathode 23, based on $H^+$ ions contained in water passing through the intermediate chamber 43, and a closed-loop configuration enabling flow of current is formed, when a voltage is applied thereto.

In this embodiment, since the cation exchange resin is not present in the intermediate chamber 43, a high voltage of 15 to 25V may be applied when a constant current is controlled and heat may thus be generated. Accordingly, a heat radiator (not shown) to radiate heat of the electrolytic bath 22 may be separately provided.

In this embodiment, water introduced into the cathode chamber 41 of the electrolytic bath 22 has a pH of 6.2 to 6.6, an ORP of +300 mV, and a flow rate of 100 ml/m, and reducing water produced in the electrolytic bath 22 has a pH of 9 to 10 and an ORP of −400 to −550 mV, when the current applied to the electrolytic bath 22 for electrolysis of water is 3 A and the voltage is 15 to 25V.

When the cation exchange resin is not present in the intermediate chamber 43, movement efficiency of hydrogen ions that move to the cathode chamber 41 is deteriorated and reducing water produced in the cathode chamber 41 has an alkaline pH of 9 to 10.

That is, reducing water produced in this embodiment has similar pH to water produced in the conventional alkali ion water purifier, but exhibits superior reducing force. Accordingly, the present embodiment may be used in a system requiring reducing water.

Figure 6A:
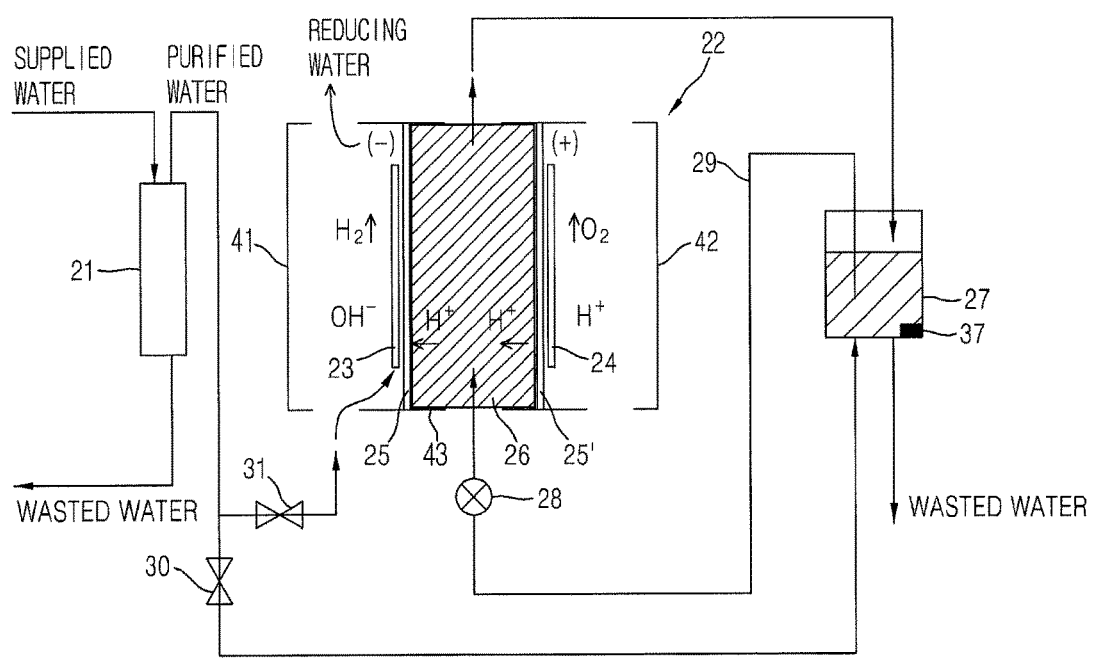
FIGS. 6a and 6b are schematic views illustrating a driving mechanism of an apparatus for producing reducing water, according to another embodiment.
Figure 6B:
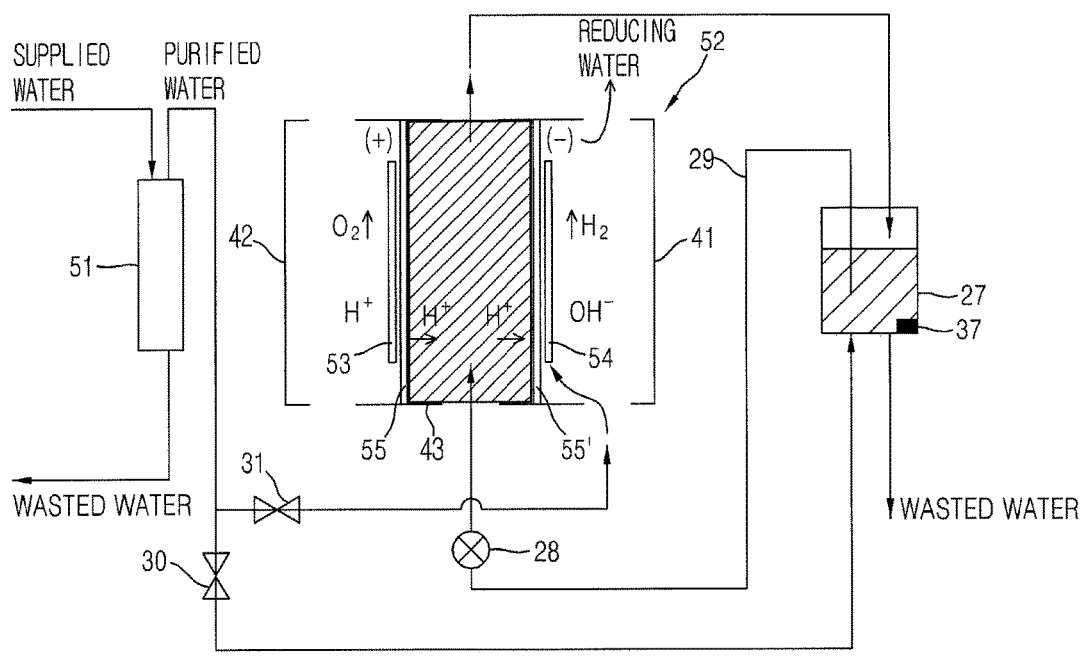

FIGS. 6a and 6b are schematic views illustrating a driving mechanism of an apparatus for producing reducing water according another embodiment, and FIG. 7 is a view illustrating a function of the cation exchange resin filled in the intermediate chamber 43.

The apparatus for producing reducing water according to the present embodiment includes: an electrolytic bath 22 including a cathode chamber 41 provided with a cathode 23, an anode chamber 42 provided with an anode 24, and an intermediate chamber 43 interposed between the cathode chamber 41 and the anode chamber 42; an RO filter 21 to purify water supplied to the electrolytic bath 22; and a circulator to supply water to the intermediate chamber 43 of the electrolytic bath.

For electrolysis of water, the electrolytic bath 22 includes the cathode chamber 41 provided with the cathode 23, the anode chamber 42 provided with the anode 24, and the intermediate chamber 43 filled with the cation exchange resin 26, interposed between the cathode chamber 41 and the anode chamber 42. Also, cation exchange membranes 25 and 25' are formed between the cathode 23 and the cation exchange resin 26 and between the cation exchange resin 26 and the anode 24, respectively.

Meanwhile, water having passed through the RO filter 21 is added to the electrolytic bath 22. The water passed through the RO filter 21 is directly introduced into the cathode chamber 41, while the water passed through the RO filter 21 is not directly introduced into the intermediate chamber 43 filled with the cation exchange resin 26 and is introduced through a water tank 27 provided in the circulator storing water passed through the RO filter 21. Since only cations pass through the cation exchange membranes 25 and 25', water introduced into the cathode chamber 41 is not moved through the cation exchange membrane 25 to the intermediate chamber 43. Similarly, water introduced into the intermediate chamber 43 is not moved through the cation exchange membrane 25 to the cathode chamber 41.

As depicted by Reaction Scheme 1 above, when a voltage of 2.057V or higher is applied, $H^+$ ions generated between the anode 24 and a water-wet cation exchange membrane 25' adjacent thereto via electrolysis are transferred to the cathode 23 based on catalytic action of the cation exchange resin 26, and the transferred H+ ions causes a neutralization reaction with $OH^-$, as depicted by Reaction Scheme 2 below, thus preventing an increase in pH of reducing water produced in the cathode 23.

$OH^-$ (generated in cathode)+$H^+$ (transferred from anode and cation exchange resin)→ $H_2O$ (neutral water)  [Reaction Scheme 2]

Accordingly, water has a negative value of ORP in a neutral pH range (5.8~8.5) due to $H_2$ generated from the cathode 23, thus exhibiting reducing force.

More specifically, as shown in FIG. 7 below, when water passed through the RO filter 21 is supplied to the cathode chamber 41 of the electrolytic bath 22 and the intermediate chamber 43 filled with the cation exchange resin, water introduced into the intermediate chamber 43 soaks the cation exchange membrane 25' contacting the anode 24.

When a voltage is applied in order to enable a predetermined current to flow in the electrolytic bath 22, water is electrolyzed between the surface of the cation exchange membrane 25' and the surface of the anode 24 to produce $H^+$ and $O_2$.

Since the $O_2$ produced in the anode 24 has a size of about 3.4 Å, water is not moved through the cation exchange membrane 25 to the cathode 23 and is discharged outside via water introduced into the cation exchange resin 26.

When water introduced into the cation exchange resin 26 stays without flowing, concentration of $O_2$ dissolved in water increases and thus oxidizes the cation exchange resin 26. As a result, the lifespan of the cation exchange resin 26 is reduced. Also, heat ($Q \propto W = I^2 R$) generated during electrolysis is not discharged and lifespan of the cation exchange membranes 25 and 25' and the cation exchange resin 26 is thus reduced.

Also, $H^+$ produced in the anode 24 is bonded to $OH^-$ produced in the cathode 23 to prevent an increase in pH that is caused by an increase in $OH^-$, although reducing force of reducing water emitted from the cathode chamber 41 is increased due to increase in $H_2$.

The electrolytic bath 22 may further include a power supply (not shown) to apply a voltage.

The cation exchange resin 26 filled in the intermediate chamber 43 may be an $H^+$-type cation exchange resin. For example, the cation exchange resin 26 is a resin in which a $SO_3H$ exchange group is linked to the surface of a polymer matrix. In this case, when the resin is soaked in water, $H^+$ ions are dissociated from the surface of the resin until they balance with $H^+$ ions in water.

As described above, the cation exchange resin 26 is filled in the intermediate chamber 43 made of a "☐"-shaped material between the cathode chamber 41 and the anode chamber 42. Based on an energy generated by a voltage difference in pure water, $H^+$ ions generated in the anode 24 cannot be moved to the cathode 23, while transfer of $H^+$ ions is possible from the anode 24 to the cathode 23 based on H+ ions dissociated from the cation exchange resin 26. Accordingly, a closed-loop configuration in which current flows even at a low voltage within a lifespan limit of the cation exchange resin 26 is formed.

Figure 8:
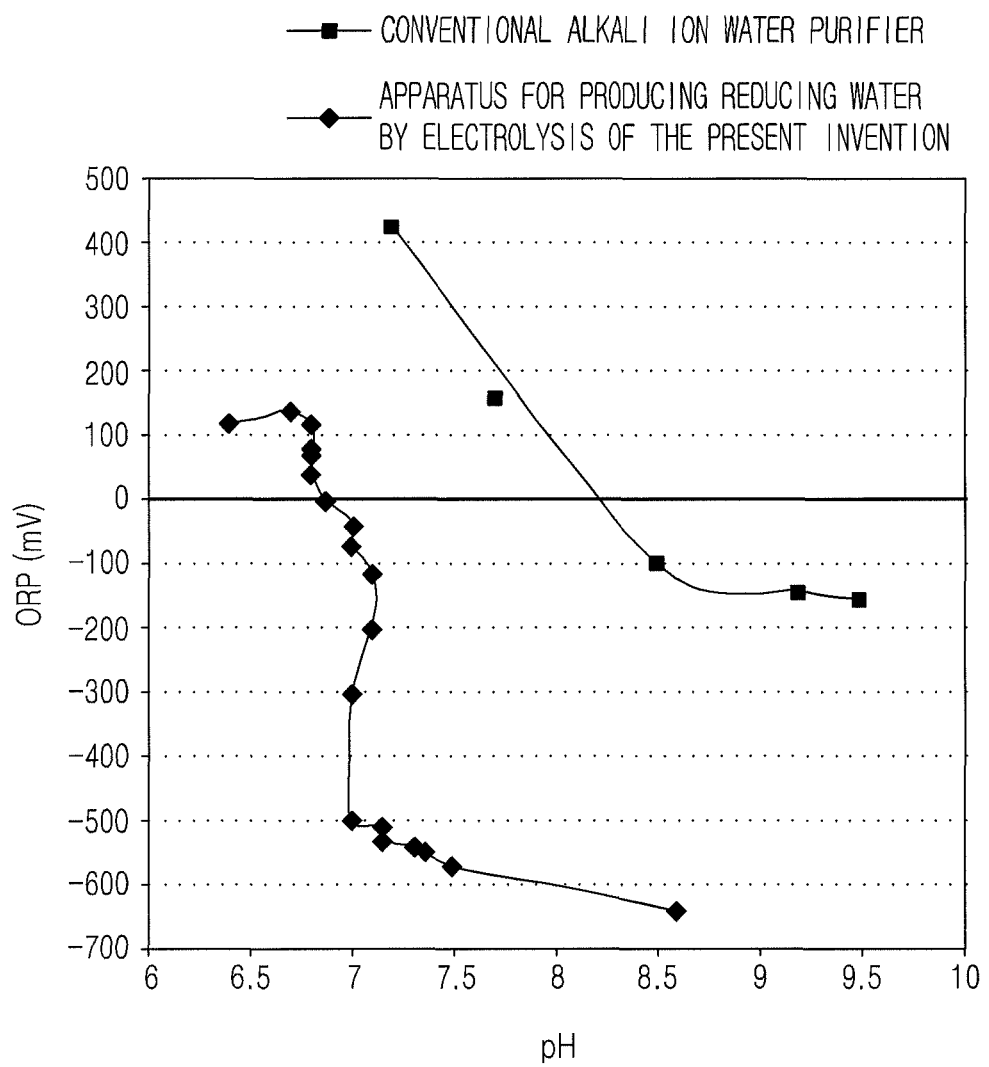
FIG. 8 is a graph showing pH and ORP properties of reducing water produced in the cathode chamber, as a result of electrolysis using the conventional alkali ion water purifier and the apparatus for producing reducing water according to the embodiment illustrated in FIG. 2 or FIG. 6.

FIG. 8 is a graph showing pH and ORP properties of reducing water produced in the cathode chamber 41, as a result of electrolysis using the conventional alkali ion water purifier and the apparatus for producing reducing water according to embodiments illustrated in FIGS. 2, 6a and 6b. Raw water are water passed through the UF filter and the RO filter 21, the alkali ion water purifier exhibits only an increase in pH from 8.5 to 9.5 according to increase in applied voltage without a great increase in ORP from −150 mV, while the apparatus for producing reducing water according to one embodiment of the present disclosure exhibits a continuous increase in ORP to −500 mV according to increase in voltage, but exhibits a stable pH range of 7 to 7.5.

Meanwhile, when water continuously passes through the cation exchange resin 26, $H^+$ ions are continuously consumed on the surface of the cation exchange resin 26. Accordingly, water is passed without electrolysis, or recycling of the cation exchange resin 26 using $H^+$ ions generated at a low current is not sufficient and deterioration in performance of the cation exchange resin 26 is inevitable, although electrolysis is performed.

As a method for recycling a conventional $H^+$-type cation exchange resin, there is a method for recycling a surface of a resin into —$SO_3H$ by immersing the resin in an HCl solution for a predetermined time and by using excess $H^+$ ions present in water.

However, the apparatus for producing reducing water according to embodiments of the present disclosure is incapable of recycling the cation exchange resin present therein by a chemical method using an HCl solution due to structural characteristics of the electrolytic bath.

Accordingly, in accordance with the embodiments of the present disclosure, water is supplied to the cation exchange resin 26, water emitted through the cation exchange resin 26 is collected, and lifespan of the cation exchange resin 26 is lengthened through a circulator supplied to the cation exchange resin 26.

As shown in FIGS. 6a and 6b, the circulator includes a water tank 27 to store water supplied to the cation exchange resin 26, a channel 29 to provide a passage, enabling water to circulate between the cation exchange resin 26 and the water tank 27, and a pump 28 to provide a driving pressure, enabling water present in the channel 29 and the water tank 27 to circulate between the cation exchange resin 26 and the water tank 27.

Water supplied from the RO filter 21 is introduced into the cathode chamber 41 or the water tank 27 of the circulator through control of the valves 30 and 31.

When water is introduced from the RO filter 21 into the water tank 27 and a predetermined amount of water is filled in the water tank 27, the pump 28 is driven, water stored in the water tank 27 is supplied to the intermediate chamber 43 of the electrolytic bath 22, and water passed through the cation exchange resin 26 of the intermediate chamber 43 is not wasted and is collected into the water tank 27 again.

The water collected in the water tank 27 is supplied to the cation exchange resin 26 again.

When this process is periodically repeated, water circulates between the cation exchange resin 26 of the intermediate chamber 43 and the water tank 27. At this time, water is supplied to the cation exchange resin 26.

Water supplied to the cation exchange resin 26 is purified while passing through the RO filter 21, which has a pH of 6.2 to 6.5. Water passed through the cation exchange resin 26 is dissociated on the surface of the cation exchange resin 26 and contains $H^+$ ions, excluding $H^+$ ions used for adjustment of pH to a neutral level, as depicted by Reaction Scheme 2, and thus has a decreased pH of 4.2 to 4.5.

When water that has a decreased pH after passing through the cation exchange resin 26 is not discarded, collected by the water tank 27, and is supplied to the cation exchange resin 26 of the intermediate chamber 43, water supplied to the cation exchange resin 26 has a decreased pH of 4.2 to 4.5 and thus has a hydrogen ion concentration equivalent or similar to a concentration of H+ ions dissociated from the surface of the cation exchange resin 26. Accordingly, the amount of $H^+$ ions dissociated and consumed on the surface of the cation exchange resin 26 is reduced and lifespan of the cation exchange resin 26 is relatively lengthened.

The amount of water stored in the water tank 27 may be decreased due to evaporation as time passes. Accordingly, the water tank 27 is provided with a water level sensor 37 to sense a level of water stored in the water tank 27. When the level of water is decreased to a predetermined level, water is supplied to the water tank 27 again and the amount of water stored in the water tank 27 may be maintained at a predetermined level or higher.

Also, when water stored in the water tank 27 is used for a long time, it may be contaminated. Accordingly, after a predetermined time, water present in the water tank 27 is discharged and new water may be filled in the water tank 27 again. For this purpose, the water tank 27 may include an outlet to discharge water outside.

Figure 9:
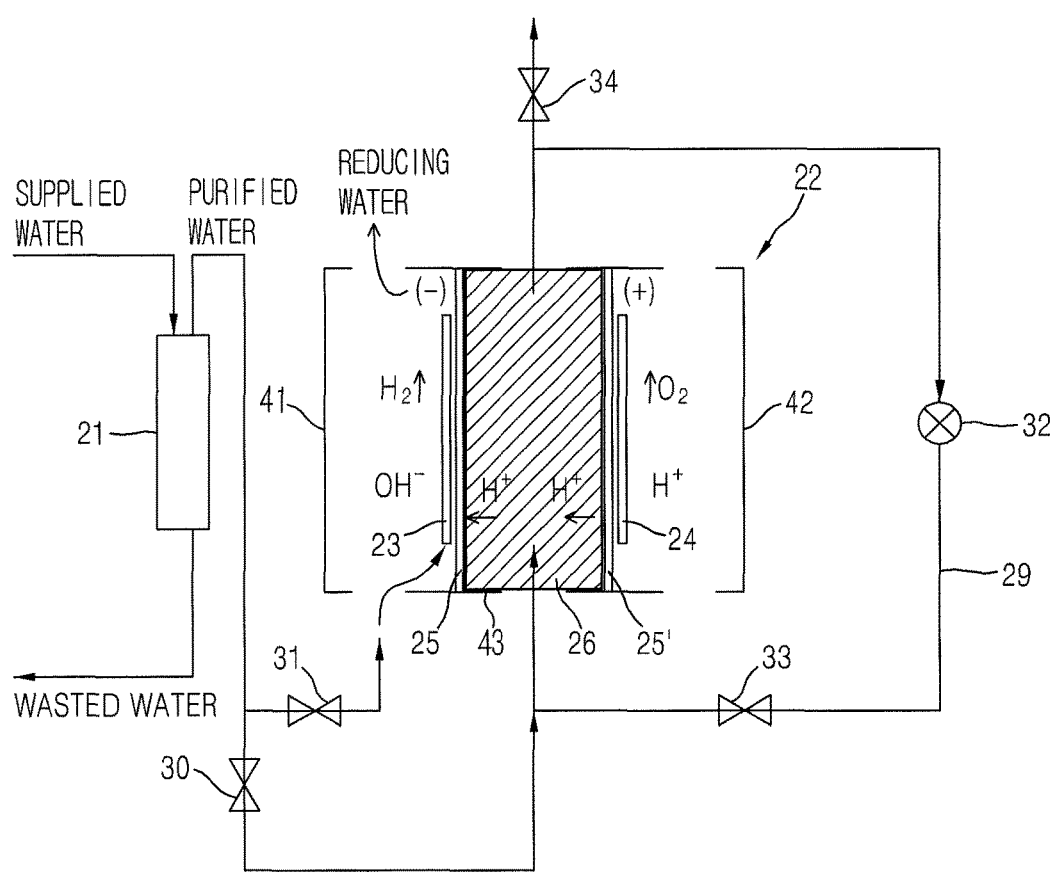
FIG. 9 is a schematic view illustrating a driving mechanism of an apparatus for producing reducing water including a circulator according to a modified embodiment of the embodiment illustrated in FIG. 6.

FIG. 9 is a schematic view illustrating a driving mechanism of an apparatus for producing reducing water including a circulator according to a modified embodiment of the embodiment illustrated in FIG. 6.

As shown in FIG. 9, the circulator includes a channel 29 to provide a passage of water circulation, enabling water supplied to the cation exchange resin 26 of the intermediate chamber 43 to be discharged from the cation exchange resin 26 and to be supplied to the cation exchange resin 26 again, and a pump 32 to provide a driving pressure, enabling water supplied to the cation exchange resin 26 to circulate along the channel 29.

Water supplied from the RO filter 21 is introduced into the cathode chamber 41 or the circulator through control of the valves 30 and 31. When water is introduced from the RO filter 21 to the circulator, water is supplied to the cation exchange resin 26 of the intermediate chamber 43 while water is circulated along the channel 29 of the circulator.

Water circulated in the circulator may be replaced with new water at a predetermined interval through control of the value 30. When the old water is replaced with new water, the old water is discharged outside through opening of the valve 34.

Since water circulated in the circulator continuously passes through the cation exchange resin 26, it absorbs heat generated by resistance due to characteristics of the electrolysis apparatus and increases in temperature.

Figure 10:
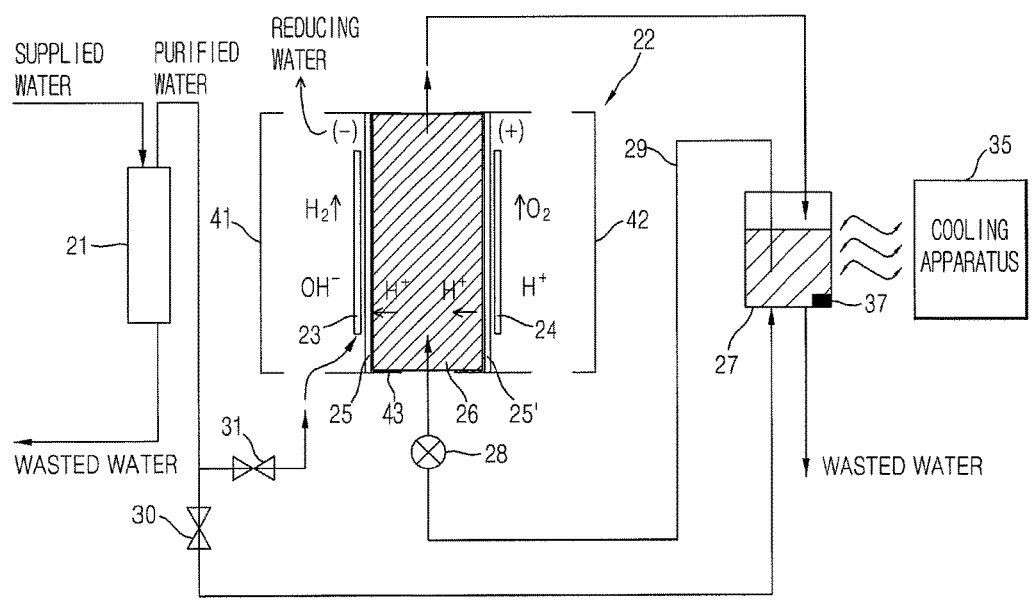
FIG. 10 is a schematic view illustrating a driving mechanism of an apparatus for producing reducing water including a cooling apparatus according to the embodiment illustrated in FIG. 6.

Since increase in the temperature of water supplied to the cation exchange resin 26 may decrease durability of the cation exchange resin 26, the apparatus for producing reducing water may include a cooling apparatus 35 in order to reduce temperature of water circulated in the circulator (see FIG. 10). The cooling apparatus 35 may be a fan, or a cooler using a refrigerant or a thermoelectric semiconductor.

The cation exchange resin is recycled using $H^+$ ions generated after electrolysis together with the circulator, thereby extending lifespan of the cation exchange resin.

As shown in FIG. 6a, $H^+$ ions produced in the anode 24 by electrolysis are moved to the cation exchange membrane 25' and the cation exchange resin 26, and a part of cation exchange resin 26 adjacent to the anode 24 and the cation exchange membrane 25' has a higher $H^+$ concentration than an equilibrium state and is thus recycled.

Accordingly, as shown in FIG. 6b, after electrolysis is performed at a predetermined flow, polarity of the anode 24 and the cathode 23 of the electrolytic bath 22 of FIG. 6a that are bilaterally symmetric and water introduced into the electrolytic bath 22 are alternately changed, the cation exchange resin 26 functions to transfer $H^+$ ions as a catalyst and recycle the same, thus continuously producing reducing water. Also, since water flows only in one direction is reversed, contamination of the ion exchange membrane is prevented by reversing flow of water that may be generated.

That is, via electrode interchange, the cathode 23 of FIG. 6a is changed into the anode 53 of FIG. 6b, the anode 24 of FIG. 6a is changed into the cathode 54 of FIG. 6b, and the cation exchange resin 56 passed through the RO filter 51 in FIG. 6b is introduced into the cathode 54 and the cation exchange resin 56. Since this structure is bilaterally symmetric based on the cation exchange resin 56, depending on the polarity of electrodes, the cathode 23 and the anode 24 may be interchanged.

Figure 11A:
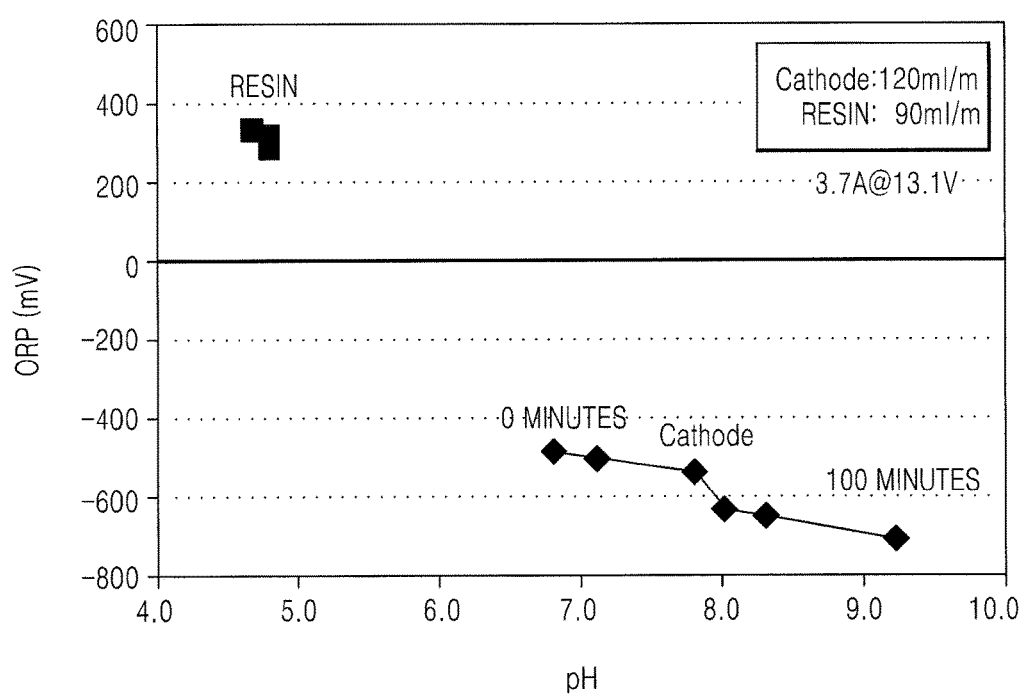
FIGS. 11a and 11b are graphs showing pH and ORP properties of reducing water produced in the cathode before and after electrode interchange in the apparatus for producing reducing water described in FIGS. 6a and 6b.
Figure 11B:
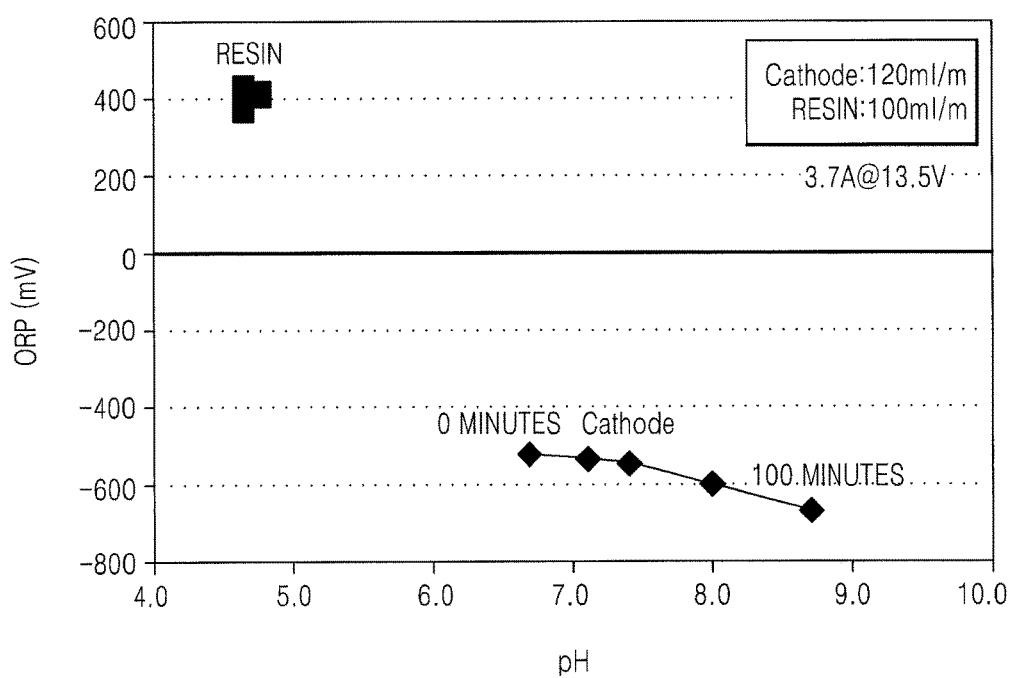

FIGS. 11a and 11b are graphs showing pH and ORP properties of reducing water produced in the cathode before and after electrode interchange in the apparatus for producing reducing water described in FIGS. 6a and 6b.

FIG. 11a shows variation in pH of reducing water according to deterioration in performance of the cation exchange resin, while water flows at a predetermined flow rate. As can be seen from FIG. 11a, water emitted from the cathode exhibits an increase in pH due to deterioration in performance of the cation exchange resin.

When electrodes and channels are interchanged as shown in FIG. 11b, pH is returned to a neutral range and ORP is maintained at −500 mV or higher.

Figure 12A:
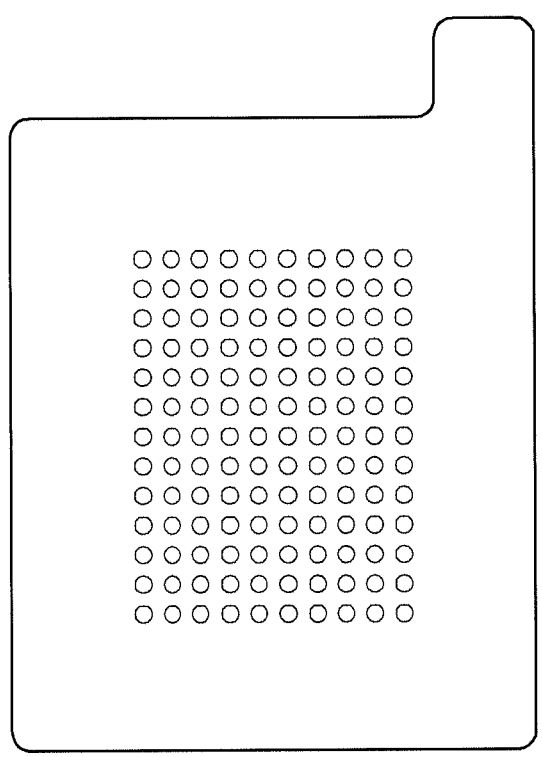
FIGS. 12*a* and 12*b* are views illustrating a shape of the electrode used for the apparatus for producing reducing water.
Figure 12B:
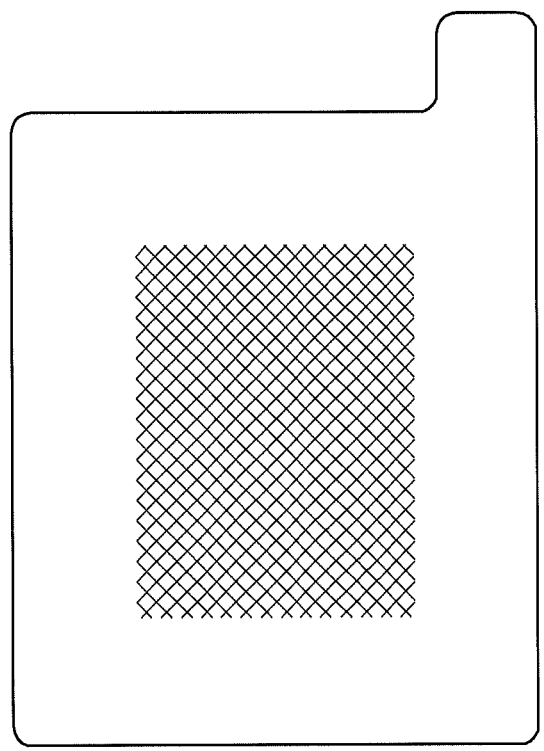

As shown in FIGS. 12a and 12b, the cathode and the anode used for the electrolytic bath according to embodiments of the present disclosure may have a plurality of pores, through which water passes, as shown in FIGS. 12a and 12b, wherein the pores are spaced from one another by a predetermined distance (FIG. 12a), or may be a mesh (net) structure in order to further increase surface area (FIG. 12b).

Based on this structure, electrolytic efficiency may be improved. A material for electrodes may be a biologically stable titanium electrode coated with platinum that does not cause ionization reaction due to applied voltage, exhibits superior electrical conductivity and is biologically stable.

In the apparatus for producing reducing water according to embodiments of the present disclosure, the cathode and the cation exchange membrane may contact the cation exchange resin, and the cation exchange resin and the cation exchange membrane may contact the anode.

Figure 13:
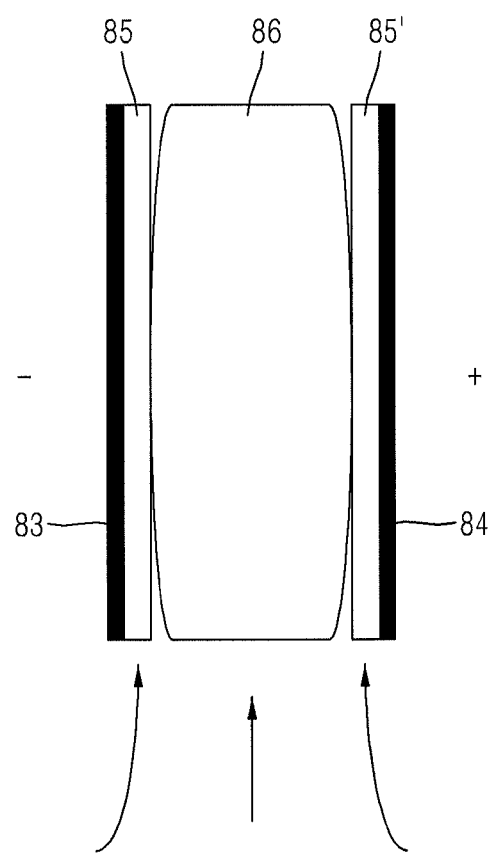
FIG. 13 is a view illustrating configurations of a cation exchange resin, a cation exchange membrane and electrodes in the apparatus for producing reducing water according to embodiments of the present disclosure.

FIG. 13 is a view illustrating configurations of a cation exchange resin, a cation exchange membrane and electrodes in the apparatus for producing reducing water according to the embodiment of the present disclosure.

When a predetermined distance is present between the cation exchange membranes 85 and 85' and the electrodes 83 and 84, efficiency of moving $H^+$ ions generated in the anode 84 to the cation exchange membrane 85' and the cation exchange resin 86 may be deteriorated and efficiency of neutralizing pH of water in the cathode 83 may be deteriorated.

Accordingly, as shown in FIG. 13, preferably, the cation exchange resin 86, the cation exchange membranes 85 and 85' and the electrodes 83 and 84 contact one another. Also, since only cations are passed through the cation exchange membranes 85 and 85', water cannot be moved through the cation exchange membrane. Accordingly, an area in which water is contained is divided based on the cation exchange membrane.

The apparatus for producing reducing water according to one embodiment of the present disclosure is capable of producing neutral (pH 5.8~8.5) reducing water.

Furthermore, the apparatus may be applied to dispensers or indoor humidifiers of household and business refrigerators. Also, the reducing water produced by the apparatus is highly active reducing water that has a maximized $H_2$ dissolved level at room temperature and contains finely cleaved water molecules, thus being utilized in a variety of applications including health, cosmetics, and agricultural fields.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An apparatus for producing reducing water comprising:
   an electrolytic bath comprising a cathode chamber provided with a cathode, an anode chamber provided with an anode, and an intermediate chamber interposed between the cathode chamber and the anode chamber, wherein the intermediate chamber comprises a cation exchange resin that dissociates hydrogen ions when the cation exchange resin reacts with water; and
   a circulator to supply water to the intermediate chamber and supply water discharged through the cation exchange resin to the intermediate chamber again, the circulator comprising a water tank to store water supplied to the intermediate chamber, a channel to enable water present in the water tank to circulate between the intermediate chamber and the water tank, and a pump to circulate water present in the water tank between the intermediate chamber and the water tank;
   a reverse osmosis (RO) filter to purify water that is directly supplied to the electrolytic bath and the water tank of the circulator;
   a plurality of valves to control flow of water so that the water supplied from the RO filter is supplied directly to one of the cathode chamber and the water tank; and
   a cooling apparatus configured to reduce the temperature of the water in the water tank and comprising any one of a fan and a cooler using a refrigerant or a thermoelectric semiconductor, the water in the water tank being from both the RO filter and the circulator,
   wherein the cathode chamber and the intermediate chamber are both provided with an inlet through which water is supplied, and an outlet through which water is discharged,
   a cation exchange membrane is provided between the cathode chamber and the intermediate chamber, and
   the water tank comprises an outlet through which water stored in the water tank is discharged outside.

2. The apparatus according to claim 1, wherein the water tank comprises:
   a water level sensor to sense a level of water stored in the water tank.

3. The apparatus according to claim 1, further comprising:
   a cation exchange membrane disposed between the anode chamber and the intermediate chamber.

4. The apparatus according to claim 3, wherein the cathode, the cation exchange membrane provided between the cathode chamber and the intermediate chamber, and the cation exchange resin contact one another.

5. The apparatus according to claim 3, wherein the cation exchange resin is recycled by reversing the cathode and the anode.

* * * * *